Sept. 20, 1932.  K. E. PEILER  1,878,598
SUPPLY POOL LEVEL REGULATOR
Filed May 14, 1929   2 Sheets-Sheet 1
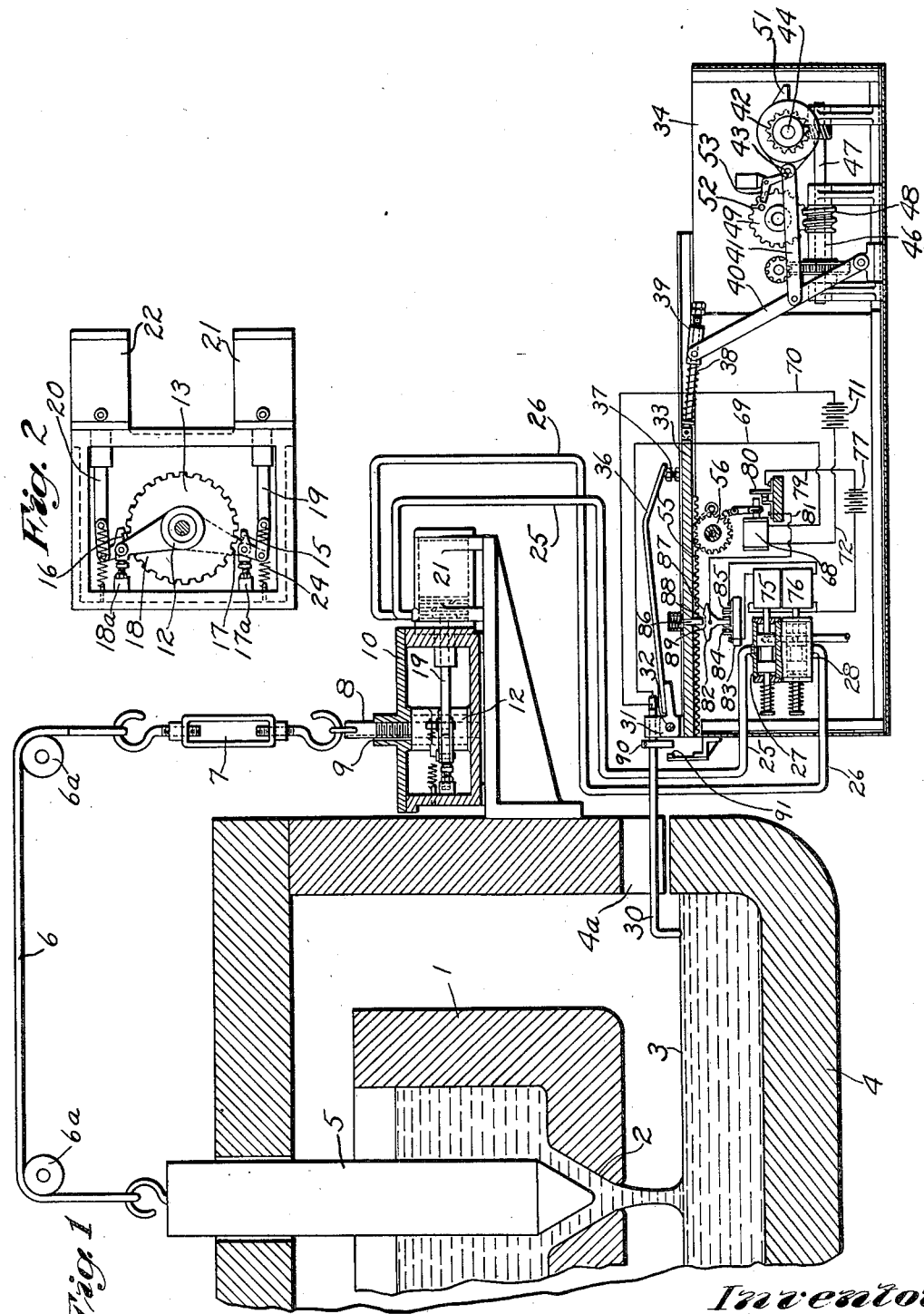

Sept. 20, 1932.　　　　K. E. PEILER　　　　1,878,598
SUPPLY POOL LEVEL REGULATOR
Filed May 14, 1929　　　2 Sheets-Sheet 2
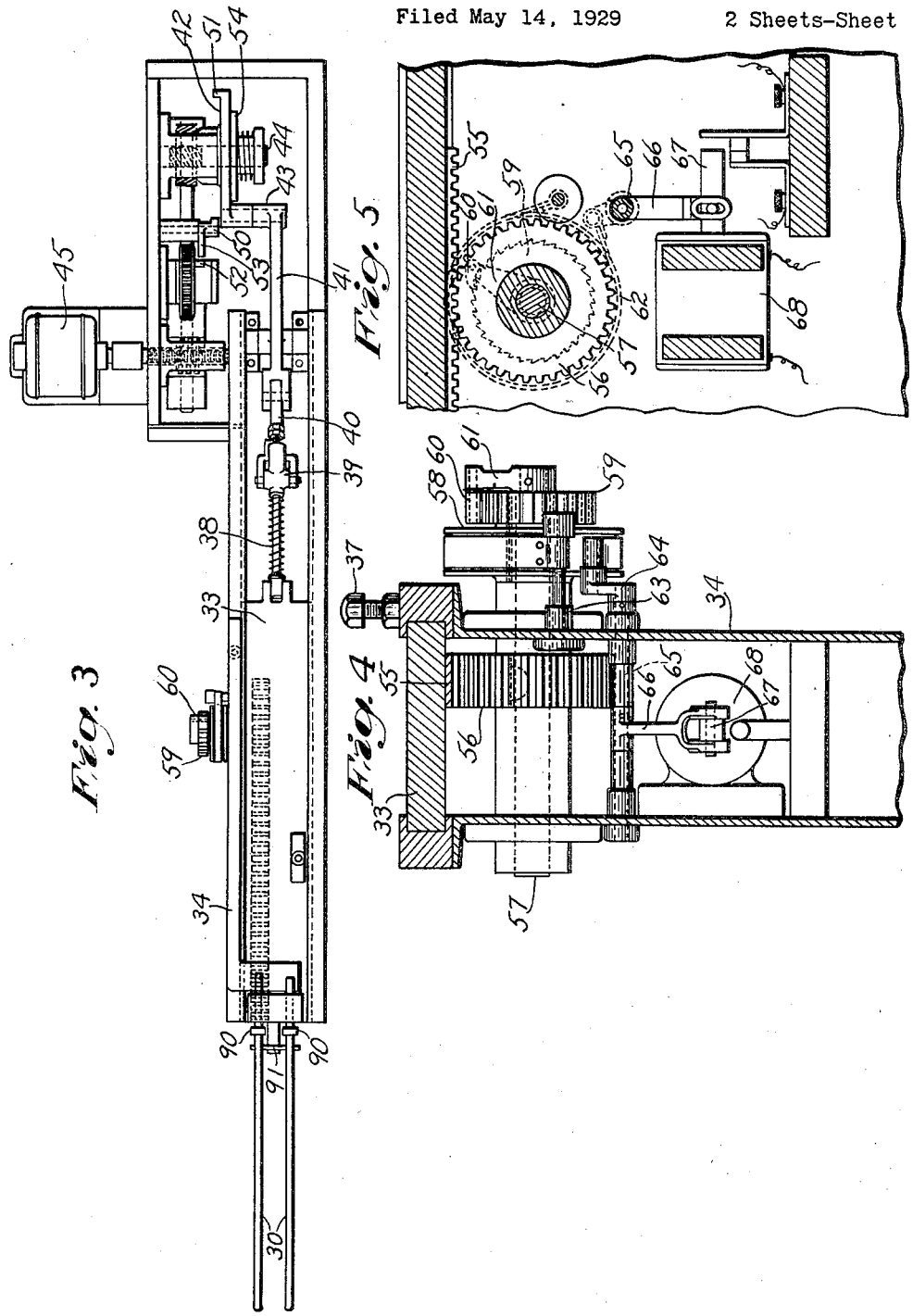
Witness;
W. B. Thayer.
Inventor;
Karl E. Peiler,
by Brown & Parham
Attorneys Patented Sept. 20, 1932

1,878,598

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

SUPPLY POOL LEVEL REGULATOR

Application filed May 14, 1929. Serial No. 362,954.

My invention relates generally to means for and methods of providing a pool of molten glass from which glass may be fed or gathered for subsequent fabrication into glassware, and more particularly to the regulation of the level of such pool.

It is usual in glass working operations to provide a pool of molten glass in a container appurtenant to or adjacent to a glass melting tank or furnace and to deliver glass from the melting tank or furnace constantly to the pool at a rate which is intended to approximate the rate at which glass is gathered, fed, or otherwise removed from the pool, as for fabrication into glassware. Such container may be a furnace forehearth, extension or boot connected with the furnace or melting tank by a flow passage or channel; or such container may be a separate receptacle, such as a rotary pot, to which glass may flow from the furnace or from a passage connected with the furnace through a discharge spout or outlet. It is usual to regulate the delivery or flow of glass from the furnace or melting tank to the pool by an adjustable gate, stopper or valve, which obstructs such flow or delivery to a greater or less extent and which, as above stated, is set at a position which is intended to permit delivery of glass to the pool at a rate adequate to maintain the level of glass in the pool substantially constant. However, under the conditions just mentioned, the level of glass in the pool may vary considerably because of change of conditions and temperature of the glass delivered to or in the pool, change in the rate of feeding or gathering of glass from the pool, and for other reasons. Variations in the level of the glass in the pool are objectionable when the glass is fed from the pool through a submerged outlet and may deterimentally affect the operations of the associate glass working mechanism because the head of glass in the pool is a factor in determining the rate at which glass will be fed from the pool in a given time under given conditions. For similar reasons, variations of the level of the glass in the pool also are objectionable when glass is gathered therefrom by the use of suction gathering receptacles or the like which are periodically dipped or otherwise brought into contact with the surface of the pool, because the results of normal operations of such glass gathering means may be deterimentally affected by any appreciable variation in the level of the glass in the pool. The ultimate result in each instance is that the quality of the glassware produced from glass fed or gathered from the pool may be impaired when the level of the glass in the pool fluctuates or varies.

An object of the present invention therefore is to provide efficient and reliable means for automatically maintaining a pool of glass at a predetermined level, irrespective of factors which tend to change the level of the pool.

A further object of the invention is to provide a glass level regulating means which will act automatically to maintain the pool of glass substantially at a predetermined level without requiring a float or other change-of-level responsive member to be located continuously in or on the pool with consequent likelihood of contamination of the glass of the pool.

A further object of my invention is to provide a novel construction of the above character including means to determine or "feel" the level of glass by contacting with the surface thereof. Such means is capable of a large variety of uses for operating any kind of mechanism in response to changes of the level of glass in the pool. For example, it may be adapted to control the flow of glass to the gathering pool according to the extent to which said means is moved before contacting with the surface thereof. If the said means is moved to an extent corresponding to the level at which it is desired to maintain the glass, the flow of glass to the gathering pool may remain constant; but if the said means is moved to an extent greater or less than that required to contact with the surface of the glass when the latter is at the desired level, the supply of glass to the gathering pool is increased or decreased until the desired level is attained.

It also is an object of my invention to provide novel apparatus of the above character, including feelers which are moved quickly at timed intervals into and out of contact with the surface of the glass in the gathering pool and which control the flow of electric current through a circuit or circuits, which in turn may effect operation of means for adjusting the flow of glass to the pool to maintain the latter at a predetermined level. The purpose in providing for quick movements of the feelers at timed intervals is to prevent them from being unduly heated by the glass, and to adjust the flow of glass to the pool gradually or in increments.

Other objects and advantages of the invention from a practical standpoint will be pointed out in the detailed description thereof which follows, or will become apparent from such description.

In order that the invention may be readily comprehended and its manifold advantages appreciated, reference should be had to the accompanying drawings in which I have illustrated a preferred embodiment thereof. But it is to be understood that the invention is susceptible to embodiment in other forms of construction than that shown and that changes may be made in the details of construction without departing from the principle of the invention.

In the said drawings:

Figure 1 is a view in longitudinal vertical sectional elevation of apparatus embodying my invention, showing fragmentary portions of a glass furnace and associate supply container, the glass in the latter being at the desired level and the feelers being in contact with the surface thereof, the other parts of the apparatus also being shown in the positions which they assume when the level of glass in the supply container is at such desired level;

Fig. 2 is a view in top plan of pawl and ratchet mechanism for adjusting the valve or plunger in the outlet of the glass melting furnace;

Fig. 3 is a view in top plan of the feelers and associated mechanism for moving the feelers into and out of contact with the surface of the glass in the supply container at timed intervals;

Fig. 4 is a view in tranverse sectional elevation on an enlarged scale taken on the line 4—4 of Fig. 1; and Fig. 5 is a view in vertical longitudinal section on an enlarged scale, taken on the line 5—5 of Fig. 4.

The invention, broadly considered, may include a pair of electric contact members or feelers which are projected periodically through an opening in a wall of the container for the glass pool into the space above the pool and are dipped downwardly toward the pool for contact with the surface of the latter. These contacts are adapted to be electrically connected through suitable conductors, with a source of supply of electric current and with control members, so that the contact of such members with the glass will complete an electric circuit which will function when the level of the pool varies from that desired to adjust the means for regulating flow or delivery of glass to the pool so as to restore the desired predetermined level of glass in the pool. However, should the level of the glass in the pool be as desired at the time of contact of the feelers or contact members with such glass such contact will be ineffective to change the position of the means for controlling the flow or delivery of the glass to the pool. Should the level of the glass in the pool have been lowered to an undue extent so that the normal dip of the feelers or contact members is insufficient to bring such members into contact with the pool, auxiliary means are rendered effective by the dip of the feelers or contact members to complete the electric circuit and thereby to cause an increase in the delivery or flow of glass to the pool.

After completing the electric circuit substantially as above described, the feelers or contact members are quickly raised and retracted from the space above the pool and are held for an appreciable interval outside of the pool so that they will be cooled in the intervals between their periods of projection into the container. Thus, the repeated contacts between such contact members or feelers and the molten glass of the pool will not cause overheating or deterioration of such members and does not tend to detrimentally affect the condition of the glass in the pool or contaminate such glass. This is a distinct advantage over level regulating devices which require the use of a float in the body or pool of glass, the level of which is to be controlled. The reaction between the molten glass and the material of which such float is composed will cause not only a change in the buoyancy of the float, which will detrimentally affect the result sought by the provision of the float, but will cause erosion and disintegration of the float with consequent contamination of the glass.

Referring in detail to the drawings, the numeral 1 designates a portion of a glass furnace having an outlet 2 formed therein through which glass flows to a pool 3 in a supply container indicated at 4. The flow of glass through the outlet 2 is controlled by means of a valve or plunger 5 connected at its upper end to one end of a flexible member 6, the other end of which is connected to a turnbuckle 7, as shown. The member 6 may pass over and be supported by the sheaves 6a. The said turnbuckle in turn is connected to the upper end of a screw or rod 8 which is keyed as shown at 9 for vertical non-rotary movements in an opening formed in a housing designated generally at 10. This screw 8 is engaged by a screw threaded rotatable collar or sleeve 12 which is held between the top and bottom of the casing 10, and carries a ratchet wheel 13, which preferably is formed integrally therewith. Disposed at opposite sides of the ratchet wheel 13 are pawls 15 and 16 pivotally supported respectively by horizontal arms 17 and 18 loosely mounted respectively on the sleeve 12 below and above the ratchet wheel 13. Movements of the arms 17 and 18 to the left (looking at Fig. 2) are limited respectively by adjustable stops 17a and 18a mounted on the side wall of the housing 10. The pawls 15 and 16 are connected respectively by suitable linkage to the rods 19 and 20 of pistons which are adapted to reciprocate in cylinders 21 and 22 connected to and extending laterally from the housing 10. The said pawls normally are held out of engagement with the teeth of the ratchet wheel 13 by means of tension springs 24, Fig. 2, but when it becomes necessary to raise or lower the valve or plunger 5, fluid pressure is admitted to the appropriate cylinder 21 or 22 through a conduit 25 or 26, the admission of such fluid to the said conduits being in turn controlled respectively by electro-magnetically operated valves 27 and 28 which are operated in a manner to be hereinafter described. It will be observed that movement of the respective pistons in the cylinders 21 and 22 to the right will cause the screw or rod 8 to be raised and lowered, respectively, thereby effecting adjustments of the valve 5, and increasing and diminishing the flow of glass to the glass supply pool 3.

These adjustments of the valve 5 are made in order to maintain the level of the glass in the supply pool 3 at the desired height. In order to effect such adjustments in response to changes in level in the said pool through the operation of the valves 27 and 28, I may provide the following means. A pair of feelers or contacts 30 are provided, having downturned ends. These feelers or contact members are mounted in, but insulated from, a rocker member 31 pivoted at 32 to a slide 33 mounted in guideways formed in the top of a box-like frame structure 34. Secured to the rocker member 31 is a rocker arm 36, the downwardly and outwardly inclined end portion of which rides upon the top of a stationary adjustable screw 37 carried by the side wall of the frame 34, and thus causes vertical oscillation of the feelers or contacts 30 about the axis of the pivot element 32 as a result of reciprocation of the slide 33. The said feelers or contacts 30 are connected by suitable conductors to provide an electric circuit for controlling the operations of the valves 27 and 28, as will be explained in more detail hereinafter. Consequently, reciprocation of the slide 33 which carries the said feelers causes them to be moved to a position above the gathering pool, whereupon the inclined portion of rod 36 rides on the screw 37 and swings the said feelers into contact with the surface of the glass in the said pool. Electric current then flows between the said feelers or contacts through the said glass, and the aforesaid electric circuit, which includes the feelers or contacts, is completed.

The said feelers preferably are moved quickly into and out of contact with the glass in the gathering pool at timed intervals and are held in contact with the glass for only a brief period to prevent glass from adhering to and corroding the ends thereof, and to permit the feelers to cool. The mechanism for actuating the said feelers in this manner may be as follows. Connected to the inner end of the slide 33 is a rod or link 38 upon which is slidably mounted a sleeve 39 to which is pivotally connected an oscillatory lever 40. The said sleeve normally is held near the outer end of the rod 38 by a spring, as shown, and it will be noted that the said sleeve, spring and rod constitute a lost motion connection between the slide and the lever 40. This connection is provided for a purpose to be later described. Lever 40 in turn is connected by a link 41 to a frictionally driven crank disc 42, as indicated at 43, the said disc being loosely mounted on transverse shaft 44. This disc is alternately rapidly rotated for a brief period and held stationary for a much longer period by the following means. A motor 45 drives a longitudinal timing shaft 46 through a worm and worm gear as shown, the said timing shaft being supported in suitable bearings and having connected therewith a drive shaft 47 and carrying a worm 48 which meshes with and operates a timing gear 49. The shaft 47 drives shaft 44, previously referred to, through suitable spiral gears, these gears being designed to cause shaft 44 to be rotated at a considerably greater speed than timing gear 49. The friction disc 43 which is loosely mounted on the shaft 44 normally is held stationary for a relatively long period by means of a latch 50 which engages with a lug 51 (Fig. 3) extending from the periphery of friction disc 42. However, such engagement of the latch with the lug 51 is broken from time to time by means of a pin 52 carried by the timing gear 49, the said gear and pin being moved counter-clockwise to engage and lift lug 53, which is formed integrally with the latch 50. The resulting release of the friction disc permits it to be rapidly rotated by the engagement therewith of the continuously rotating disc 54, slidably keyed to the shaft 44, and held in frictional engagement with the disc 42 by a spring, as shown. This rapid rotation of the disc 42 causes the feelers 30 to be quickly moved inwardly through the opening 4a in a wall of the container for the supply pool and to be dipped into contact with the surface thereof, and then to be withdrawn from such contact and retracted through the opening 4a in a short period of time, preferably about 5 seconds. It will be understood that the timed intervals between successive dips of the feelers into the glass may be of any duration desired, but I prefer to operate the feelers say, every 45 seconds, the inward and outward movement of the feelers requiring about 5 seconds, as previously stated.

In order to employ these feelers or contacts 30 to adjust the supply of glass to the supply pool in response to change of level therein, it is desirable to provide mechanism for instantly stopping the dip of the feelers into the glass at the moment that they contact with the surface thereof. For this purpose, I have provided a brake, the operation of and construction of which is as follows. Formed on the under side of the slide 33 is a rack 55 which meshes with a pinion 56 fixed to a transverse shaft 57 journaled in the side walls of the frame 34 (Fig. 4). This shaft 57 projects outwardly through a side wall of the frame 34 and such outwardly projecting portion of the shaft carries a brake drum 58 loosely mounted therein, to which drum is fixed a ratchet wheel 59. A pawl 60 carried by an arm 61 fixed to the extreme outer end of the shaft 57, is adapted to engage the ratchet wheel 59, as is clearly shown in Fig. 4. A brake band 62 surrounds the periphery of the brake drum 58, one end of the said band being connected to a stud 63 extending laterally from the side wall of the frame 34, as shown, and the free end of the said band being connected to an arm 64 of a transverse shaft 65, journaled in the frame 34 and having a downwardly extending arm 66 formed thereon connected to the armature 67 of a solenoid 68.

The flow of current through the solenoid 68 is controlled by the feelers 30, that is to say, one of the said feelers is connected directly to one side of the solenoid by a conductor 69, (Fig. 1) while the other of the said feelers is connected by a conductor 70 through battery 71 and conductor 72 to the other side of the said solenoid. It therefore will be seen that the instant the feelers 30 contact with the surface of the glass in the gathering pool, a circuit will be completed through the solenoid 68 causing the brake to be applied, and the movement of the slide carrying the feelers toward the pool (Fig. 1) will be instantly stopped. Even though further movement of the slide 33 toward the pool at this time is positively prevented, the movement of the lever 41 may continue to the left (Fig. 1) to the full extent of its stroke, such movement being permitted by the lost motion connection, previously described. While the brake operates to terminate the movement of the slide 33 and feelers 30 to the left, it is ineffective to prevent movement thereof to the right because of the action of the pawl and ratchet mechanism associated therewith. Therefore, the feelers are quickly retracted by the oscillation of lever 40 to the right, the feelers thereafter being held stationary by the action of the latch 50.

As previously stated, the operation of the valves 27 and 28 is controlled by the feelers or contacts 30, such operation depending upon the extent to which the feelers are moved prior to their contacting with the surface of the glass in the gathering pool. These valves 27 and 28 are operated respectively by solenoids 75 and 76 to which current is supplied by a battery 77, one side of which is connected directly to the two solenoids and the other side of which is connected by conductor 79 to a switch 80 normally held open by the armature 67 of the brake controlling solenoid 68. The said switch in turn is connected by conductor 81 to the pivoted T-shaped blade or arm 82 of a double-throw switch 83. The contact 84 of the switch 83 is connected to the solenoid 75 for completing the circuit therethrough, while contact 85 of the said switch is connected to the solenoid 76 for the same purpose. Therefore, it will be seen that these solenoids may be energized selectively, depending upon whether the contact blade 82 of the switch engages with the contact 84 or with the contact 85. When the switch arm or blade is in neutral position, neither solenoid is energized.

The said pivoted contact blade of the double-throw switch is adapted to be operated by a pin 86 extending downwardly through and insulated from the slide 33. Such operation of the switch 82 depends upon the extent to which the slide 33 and feelers 30 are moved prior to the time at which the feelers contact with the surface of the glass in the pool, and the movement thereof is stopped. If the level of the pool is above the predetermined height, the movement of the pin 86 will be terminated when the pin has been brought into engagement with a wedge-shaped arm 87 of the T-shaped switch arm or blade 82, and has operated to rotate said arm clockwise. Such rotation of the arm or blade 82 will close the circuit through solenoid 75, switch 80 having meanwhile been closed by the operation of the brake. If the level of the glass in the pool is at the predetermined height, the pin 86 is moved farther to the left (Fig. 1) than before, during which movement it will operate the switch blade or arm as just described. But this operation will not be effective to close the circuit through solenoid 75 because at this time, switch 80 will be open and will remain open until the brake has operated to terminate the movement of the slide 33 and the pin 86. This operation of the brake may take place while the pin 86 depends into a notch 88 formed in the top of the switch contact 82. As a result, switch 83 will be held in neutral position and neither of the circuits of the solenoids 75 or 76 will be closed. On the other hand, if the level of the pool falls below the predetermined height, pin 86 will be carried still farther to the left (Fig. 1) and the movement thereof will not be stopped until the said pin has come into engagement with a shoulder 89, provided by the notch 88 in the switch blade 82. This will cause said blade to be rotated counter-clockwise as a result of which the circuit through solenoid 76 will be completed, switch 80 having been closed in the meantime by the operation of the brake.

Thus, it will be seen that if the feelers 30 are moved to an extent greater than the normal movement thereof, that is, into contact with the surface of the glass when the latter is below the desired level, the operation of the switch blade or arm 82 by the pin 86 and closing of switch 80 will cause the energization of the solenoid 76, the opening of the valve 28, the supply of pressure fluid to cylinder 22, downward movement of the screw 8 and opening movement of the valve 5 to increase the supply of glass to the supply pool. On the other hand, if the level of the glass in the supply pool rises above the desired height, the slide 33 will be stopped by the operation of the brake in such a position that pin 86 will operate the switch arm 82 to cause the circuit through solenoid 75 to be closed (switch 80 having been closed in the meantime by the operation of the said brake). Valve 27 thereupon will be moved to open position to supply pressure fluid to cylinder 21 to move the screw or rod upwardly, permitting the valve or plunger 5 to move downwardly, thereby decreasing the supply of glass to the supply pool. Such adjustments of the valve or plunger 5 will be effected from time to time in increments as required to accurately and efficiently maintain the level of glass in the supply pool at the desired height, the said feelers being moved into contact with the glass for a relatively brief period at timed intervals, as previously stated. In the event that the level of the glass in the supply pool should reach an unusually low level, that is, so low a level that the feelers would fail to contact with the surface thereof, the downwardly extending contact members 90 carried respectively by the feelers 30 will strike a short circuiting bar 91 supported in suitable manner in the path of travel of the contacts 90, as is clearly shown in Figs. 1 and 3. Thereupon, the circuit through the solenoid 68 will be completed in the same manner as if the feelers had contacted with the glass, and the forward movement of the slide 33 will be stopped by the application of the brake, and the hereinbefore described mechanism for raising the valve 5 will be actuated to permit an increased flow of glass to the supply pool.

A broad aspect of my invention comprises the provision of means for determining or "feeling" the level of a pool of glass by contacting therewith, and providing means controlled by an electric circuit completed by the contact of the said means with the glass for operating any mechanism desired according to the level of the glass at the time of contact of the "feeling" means. This principle is embodied in the invention disclosed in my copending application, Serial No. 361,854 filed May 10, 1929, for controlling the dip of gathering receptacles of a forming machine into a gathering pool.

Having thus described my invention, what I desire to claim and to secure by Letters Patent is:

1. In combination with a pool of molten glass, a pair of feelers adapted to contact with the surface of the glass in said pool, an electric circuit including said feelers adapted to be completed through the glass by the contact of said feelers therewith, and means controlled by said circuit for adjusting the level of said pool to the desired height.

2. In combination with a pool of molten glass, a plurality of feelers adapted to contact with the surface of the glass in the said pool, means for controlling the supply of glass to the said pool, an electric circuit completed by the contact of said feelers with the glass, and means controlled by said circuit for adjusting said supply controlling means.

3. In glass handling apparatus of the character described, a plurality of feelers, means for intermittently moving said feelers into and out of contact with the surface of a pool of glass, and means actuated in response to the movement of the feelers for acting upon the glass in said apparatus.

4. In apparatus for regulating the level of glass in a supply pool, a plurality of feelers, an electric circuit including said feelers, means for intermittently moving said feelers into contact with the surface of the glass in said pool to complete the circuit through said feelers, and means operating in response to the completion of the electric circuit through said feelers for instantly stopping such movement upon electrical contact of said feelers with the surface of the glass.

5. In combination with a supply pool of molten glass, means for regulating the level of said pool, and means for controlling the operation of said first-named means, comprising a plurality of feelers, means for moving said feelers toward the surface of the glass of the pool to an extent varying according to the level of said glass, and means operating upon completion of said movement of said feelers to adjust the operation of the first-named means.

6. In apparatus for regulating the level of glass in a supply pool, a plurality of feelers, an electric circuit including the feelers, means for periodically moving said feelers at timed intervals into contact with the surface of the glass in said pool to close and open said circuit and for periodically moving said feelers out of contact with the glass and into an environment cooler than that above the pool, and means for limiting the extent of contact of the feelers with the glass.

7. In apparatus for controlling the level of glass in a supply pool, a pair of feelers, means for periodically moving said feelers into and out of contact with the surface of the glass in said pool, and means responsive to the contact of said feelers with the surface of the said glass for stopping further movement of said feelers into the glass.

8. In combination with a supply pool of molten glass, means for controlling the supply of glass to said pool, a plurality of feelers, means for moving said feelers into contact with the surface of the glass in said pool when the latter is at a desired predetermined level, said last-named means also operating to move the said feelers into contact with the glass when the level thereof is at a height lower or higher than the said predetermined level, means for instantly stopping the movement of said feelers upon contact thereof with the surface of the glass in the pool of molten glass, and means responsive to the movement of said feelers for adjusting the first-named means to increase or diminish the supply of glass to the pool.

9. In combination with a supply pool, a valve for controlling the flow of glass to said pool, means for actuating said valve, a plurality of feelers, means for moving said feelers intermittently into contact with the surface of the glass in the pool, means for stopping the movement of said feelers upon contact thereof with the surface of the said glass, and means responsive to the movement of the said feelers to an extent greater or less than that necessary to bring them into contact with the surface of the glass when the level thereof is at a predetermined desired height, for operating said first named means.

10. In combination with a pool of molten glass, a valve for controlling the supply of glass to said pool, means for actuating said valve, a plurality of feelers, means for moving said feelers at timed intervals into contact with the surface of the glass in the gathering pool, means for holding the said feelers stationary at timed intervals, and means controlled by the extent of movement of the said feelers in establishing contact with the pool for operating the first-named means.

11. The combination with a pool of molten glass, means for controlling the level of the glass in said pool, comprising a plurality of feelers, means for moving said feelers into contact with the surface of the glass in the said pool, means for instantly stopping such movement upon contact of the feelers with the glass, means controlled in response to the extent of movement of the said feelers in establishing contact with the glass of the pool to control the level of the glass in the said pool, and means acting normally to maintain the last-named means inactive.

12. In combination with a pool of molten glass, means for controlling the supply of glass to said pool, means for actuating said first-named means, means operating automatically for determining the level of the glass in the said pool, said means comprising a plurality of feelers, means for intermittently moving said feelers into contact with the surface of the glass in said pool, and means carried by said last-named means for controlling the operation of said actuating means.

13. In combination with a pool of molten glass, means for controlling the supply of glass to said pool, mechanism for actuating said first-named means, means operating automatically for determining the level of the glass in the said pool, said means comprising a plurality of feelers, means for moving said feelers into contact with the surface of the glass in said pool, means for instantly stopping the operation of said moving means upon contact of the said feelers with the said glass, and means carried by the said moving means for controlling the operation of said mechanism.

14. In combination with a pool of molten glass, means for variably supplying glass to said pool, a plurality of feelers, means for moving said feelers to varying extent corresponding to the variations in the level of the glass in said pool to cause the said feelers to contact with said glass, said last-named means including a slide, means carried by said slide for controlling said first-named means, and means for instantly stopping the movement of said slide upon the contact of the said feelers with the glass in the said pool, said last-named means including means normally operating to prevent variations in the supply of glass to the gathering pool by said first named means.

15. The combination with a pool of molten glass, of means for controlling the delivery of molten glass to said pool, and automatically operated means moved into and out of contact with the glass for measuring the level of glass in the pool with respect to a predetermined level, means for automatically varying the delivery of glass to the pool according to variations from said level, and means operated by the first-named means for controlling the operation of the second-named means.

16. The combination with a container holding a pool of molten glass, of means projected periodically into the container and toward the surface of said pool for measuring the level of the glass therein with respect to a predetermined level, said level measuring means being periodically retracted from the container, and means controlled by the glass level measuring movements of said means for controlling the delivery of glass to said pool.

17. In apparatus of the character described, the combination of a container for holding a pool of liquid having electrical conducting properties, means for supplying liquid to said pool, and means adapted to be moved periodically into contact with the surface of said pool for controlling said liquid supplying means.

18. In apparatus for controlling the level of a pool of molten glass, contact means for controlling the flow of electric current through a circuit, means for moving said contact means into contact with the glass to complete said circuit, and means for completing said circuit upon the failure of said contact means to contact with the glass when the said contact means is moved toward the surface thereof.

Signed at Hartford, Connecticut, this 11 day of May, 1929.

KARL E. PEILER.